United States Patent [19]
Koyanagi et al.

[11] Patent Number: 5,630,575
[45] Date of Patent: May 20, 1997

[54] ELASTIC MOUNT ASSEMBLY

[75] Inventors: Masashi Koyanagi; Yoshiaki Hamada; Hitoshi Furuhashi; Kazuhiro Yasuda, all of Saitama, Japan

[73] Assignee: Honda Giken Kogyo Kabushiki Kaisha, Tokyo, Japan

[21] Appl. No.: 465,332

[22] Filed: Jun. 5, 1995

[30] Foreign Application Priority Data

Jun. 22, 1994 [JP] Japan ................... 6-140587

[51] Int. Cl.$^6$ ................ F16C 27/06; F16J 15/16
[52] U.S. Cl. ................ 267/140.3; 267/141.7; 267/293; 277/12; 277/97; 277/DIG. 9
[58] Field of Search ................ 267/293, 294, 267/141.1, 141.2, 141.6, 141.7, 140.3, 140.4, 140.11, 140.12, 140.13; 277/12, 63, 97, DIG. 4, 237 R, 185, 152, DIG. 9

[56] References Cited

U.S. PATENT DOCUMENTS

| 3,976,338 | 8/1976 | Trachte et al. ................ 267/292 |
|---|---|---|
| 4,767,108 | 8/1988 | Tanaka et al. ................ 267/293 |
| 5,026,031 | 6/1991 | Court ................ 267/293 |
| 5,058,867 | 10/1991 | Hadano et al. ................ 267/141.7 |
| 5,076,725 | 12/1991 | Nakaura ................ 267/141.2 |
| 5,100,114 | 3/1992 | Reuter et al. ................ 267/293 |

FOREIGN PATENT DOCUMENTS

| 196810 | 9/1986 | Japan ................ 267/293 |
|---|---|---|
| 243539 | 10/1988 | Japan ................ 267/293 |
| 51583 | 3/1991 | Japan ................ 267/141.2 |
| 90409 | 4/1991 | Japan ................ 267/141.2 |
| 3-25451 | 6/1991 | Japan . |

*Primary Examiner*—Scott W. Cummings

[57] ABSTRACT

An elastic seal member includes a watertight seal around the outside of a rubber cushion between the inner and outer cylinder portions and a cover member for covering the outer face of the elastic seal member with a space therebetween so that the elastic seal member is not exposed to water pressure during washing of a vehicle.

17 Claims, 3 Drawing Sheets

ELASTIC MOUNT ASSEMBLY

BACKGROUND OF THE INVENTION

1. Field of the Invention

The present invention relates to a rubber mount device of a vehicular engine and, more particularly, to a dust seal structure for a rubber mount device, which has an outer cylinder portion formed in either one of a vehicle body and an engine. An inner cylinder portion is fixed with a bolt to a support portion formed in either one of the engine and a vehicle body. The inner and outer cylinders are fitted to each other via a rubber cushion.

2. Description of Background Art

In the rubber mount device described above, water, pebbles or mud may stick to or deposit on a recess which is defined by the axially outer end faces of the rubber cushion and the inner and outer cylinder portions. Thus, the rubber mount device cannot effectively perform its inherent damping function and also detracts from the durability of the device. In order to solve these problems, there already exists a proposal (as disclosed in Japanese Utility Model Registration No. 25451/1991, for example), in which a flexible cover member for covering the outer end faces of the rubber cushion is interposed between the inner and outer cylinder portions.

In Japanese Utility Model Registration No. 25451/1991, the elastic cover member is made of a relatively soft material so that it may be smoothly deformed according to the elastic deformation of the rubber cushion thereby to seal the inner and outer cylinder portions. As a result, the cover member may be largely deformed to permit water or mud to be received into the aforementioned recess when it is directly subjected to a high water pressure such as the pressure of washing water injected under a high pressure from a nozzle.

In Japanese Utility Model Registration No. 25451/1991, the device includes a cover member which is formed to have a drain port in its bottom portion so that the breached water can be discharged. However, even with this drain port, complete removal of the water or mud is difficult once it has entered into the cover member. Furthermore, fine dust or the like may enter the cover member through the drain port.

SUMMARY AND OBJECTS OF THE INVENTION

The present invention has been performed in view of such background and has an object to provide a dust seal mechanism in a rubber mount for a vehicular engine, which completely solves the aforementioned problems in the rubber mount of the prior art by a simple structure.

In order to achieve the above-specified object, there is provided a dust seal mechanism in a rubber mount for a vehicular engine, wherein an outer cylinder portion is formed in one of a vehicle body and an engine, and an inner cylinder portion is fixed by a bolt to a support portion formed in the other of the vehicle body and the engine. The inner and outer cylinders are fitted together via a rubber cushion. The dust seal mechanism includes an elastic seal member for providing a watertight seal around the outside of the rubber cushion between the inner and outer cylinder portions. A cover member for covering an outer face of the elastic seal member leaves a space S, such that the elastic seal member is not exposed to water pressure during washing. In addition to the aforementioned feature, the cover member has an elastic vibration absorber for absorbing engine vibration in the axial direction of the bolt, and is fitted to the inner cylinder portion and clamped between the outer cylinder portion and the support portion. In addition to the aforementioned features, the elastic seal member is integrally molded in an annular shape from an elastic material and has its inner circumferential edge portion and its outer circumferential edge portion respectively lightly press-fitted against the inner cylinder portion and the outer cylinder portion.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

PREFERRED EMBODIMENTS OF THE INVENTION

A preferred embodiment of the present invention will be described in the following with reference to the accompanying drawings.

Figure 1:
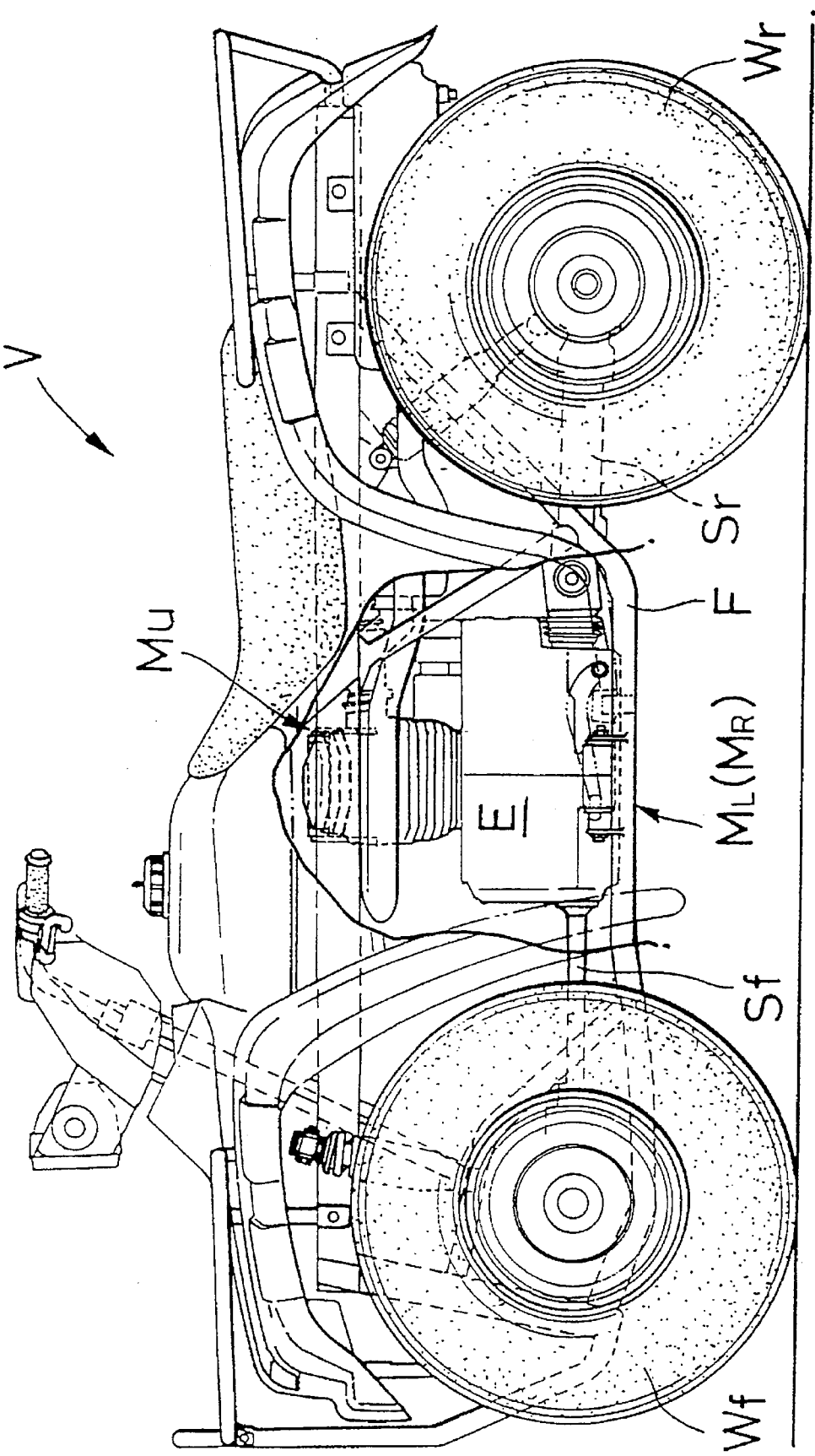
FIG. 1 is an overall side elevation of a vehicle equipped with a rubber mount device exemplifying the present invention.
Figure 2:
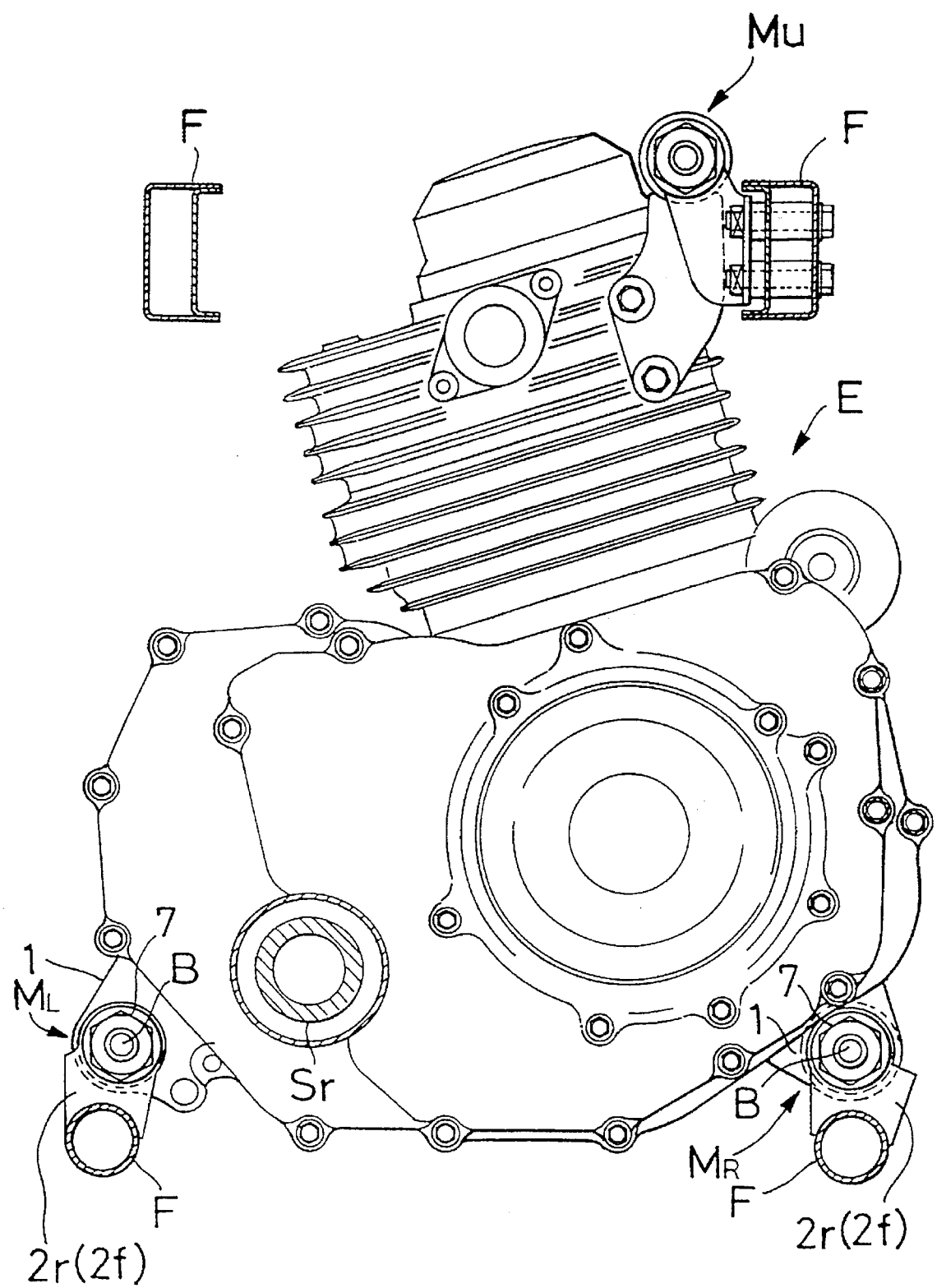
FIG. 2 is a partially cross-section rear elevation, viewed from the rear of the engine, for showing the arrangement of the engine and the body frame.
Figure 3:
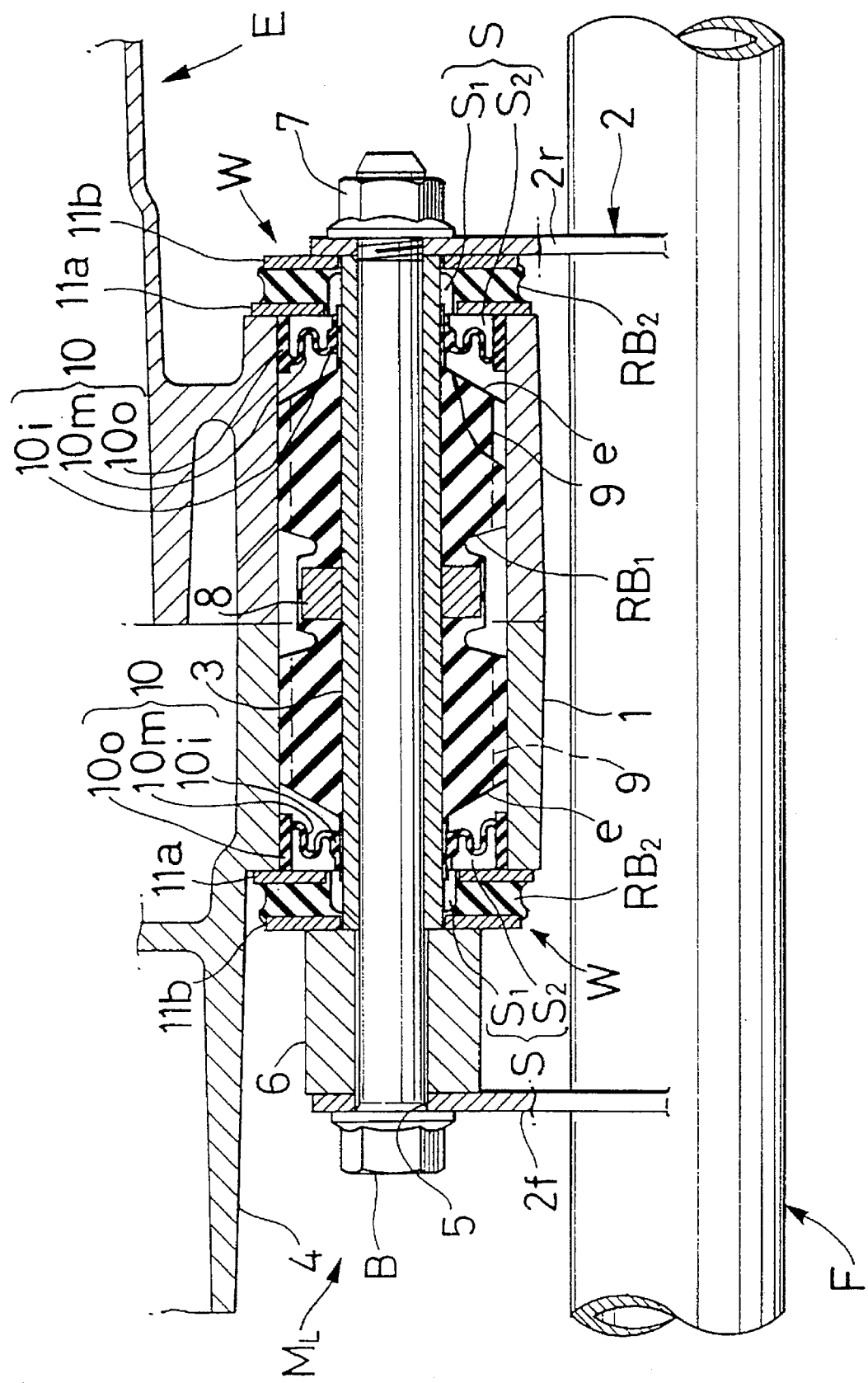
FIG. 3 is an enlarged longitudinal cross-section of the rubber mount.

As illustrated in FIGS. 1–3, a body frame F of a four-wheel all terrain vehicle V for off-road travel, supports an engine E with transmission, i.e. a power unit which is positioned at a longitudinally central portion of the body for driving front wheels Wf and rear wheels Wr via front and rear drive shafts Sf and Sr. The engine E is supported through a plurality of rubber mounts $M_L$, $M_R$ and $M_U$. The dust seal structure of the present invention is applied to at least one portion (i.e. a pair of lower transverse rubber mounts $M_L$ and $M_R$ in the embodiment shown in the drawing) of these rubber mounts $M_L$, $M_R$ and $M_U$. Since these paired lower transverse rubber mounts $M_L$ and $M_R$ have substantially identical structures, the specific structure thereof will be described based on the lefthand rubber mount $M_L$ only, with reference to FIG. 3.

The aforementioned rubber mount $M_L$ is constructed such that an outer cylinder portion 1, formed in either one of the body frame F and the engine E, (the engine E in the embodiment shown) and an inner cylinder portion 3, fastened by a bolt B to a support portion 2 formed in the other (the body frame F in the embodiment shown), are concentrically fitted one to the other via a first rubber cushion $RB_1$. This first rubber cushion $RB_1$ constitutes the rubber cushion of the present invention. The outer cylinder portion 1 integrally extends in the longitudinal direction of the body of the vehicle from the outer face of a crankcase 4 of the engine E, and the support portion 2 is composed of a pair of longitudinal support brackets 2f and 2r which integrally protrude from one side of the body frame F and are longitudinally juxtaposed to each other across a gap, these individual brackets 2f and 2r being formed with through holes 5 for the aforementioned bolt B.

Moreover, the aforementioned inner cylinder portion 3 is made of a metal pipe which is prepared by bake bonding the first rubber cushion $RB_1$ to the outer circumference thereof. The rear end portion of the inner cylinder portion 3 directly abuts the rear support bracket 2r while the front end portion thereof abuts the front support bracket 2f via a collar 6. Thus, the bolt B is threaded through the inner cylinder portion 3, the collar 6 and the front and rear support brackets 2f and 2r and can have its rear end portion together with the collar 6 fastened by a nut 7 to the rear support brackets 2f and 2r.

On the outer circumference of the aforementioned inner cylinder portion 3, a retaining projection 8 for restricting deformation over a predetermined amount in the radial direction of the first rubber cushion $RB_1$ is integrally fixed to substantially the central portion in the longitudinal direction thereof. Meanwhile, the first rubber cushion $RB_1$ is basically formed into a cylindrical shape having a plurality of grooves 9 in its outer circumference and is closely fitted in the inner circumference of the outer cylinder portion 1 so that it functions mainly as a vibration proofing means for absorbing engine vibrations in a direction perpendicular to the axial direction of the bolt B. This first rubber cushion $RB_1$ has its two axially outer end faces e tapered to converge outward to define annular recesses by way of the respective outer end faces e and the inner and outer cylinder portions 3 and 1. In each of these recesses, there is arranged an elastic seal member 10 for hermetically sealing the gap between the inner and outer cylinder portions 3 and 1 against the outer side of the rubber cushion $RB_1$.

This elastic seal member 10 is constructed by integrally molding an elastic material such as rubber, formed in an annular shape, into a short, cylindrical inner bead portion 10i to be closely fitted to the outer circumference of the inner cylinder portion 3 by means of its own elastic constricting force; a short, cylindrical outer bead portion 10o to be closely fitted to the inner circumference of the outer cylinder portion 1 by means of its own elastic expanding force; and a thin seal body 10m for connecting the two bead portions 10i and 10o together. To assemble this elastic seal member 10, it Is sufficient to lightly press-fit the inner bead portion 10i and the outer bead portion 10o respectively to the outer circumference of the inner cylinder portion 3 and the inner circumference of the outer cylinder portion 1, thereby greatly facilitating assembly thereof.

Between the front end portion of the aforementioned outer cylinder portion 1 and the collar 6, and between the rear end portion of the same outer cylinder portion 1 and the rear support bracket 2r, individually clamped thrust washers W are provided which fit the inner cylinder portion 3 through their central portions. Each of the thrust washers W constitutes the cover member of the present invention for covering the outer face of the corresponding elastic seal member 10 through an annular space S. Thus, each thrust washer W is composed of a second rubber cushion $RB_2$, having a ring plate shape, for acting as an elastic vibration absorber and a pair of braces 11a and 11b, bake bonded and fixed to the front and rear end faces of the rubber cushion $RB_2$. The thrust washers W function as vibration proofing means for absorbing engine vibration mainly in the axial direction of the bolt B (the longitudinal direction of the vehicle body).

Of the paired braces 11a and 11b in each thrust washer W, the first brace 11a which abuts against the outer end of the outer cylinder portion 1 is made to have larger external and internal diameters than those of the second brace 11b. Thus, between the inner circumference of each second rubber cushion $RB_2$ and the outer circumference of the inner cylinder portion 3, there is formed a first annular space ($S_1$) which has direct communication with a second annular space ($S_2$) defined between the first brace 11a and the elastic seal member 10. The two spaces ($S_1$) and ($S_2$) together form the aforementioned space S.

Each thrust washer W is clamped and held with a predetermined fastening allowance, with the second rubber cushion $RB_2$ being axially compressed and deformed by a predetermined amount, together with the outer cylinder portion 1 and the collar 6 between the front and rear support brackets 2f and 2r. The jig, not shown, is used for assembling these elements. In the assembled state, the second rubber cushion $RB_2$ of each thrust washer W has a relatively high rigidity against a thrust load so that it can firmly withstand high water pressure while washing the vehicle without elastic deformation.

Incidentally, the upper rubber mount device $M_U$ is located at a relatively high position so that it is minimally exposed to water during washing or water splashed upwards from the road surface. Thus, the rubber mount $M_U$ surpasses the conventional one which is not equipped with the aforementioned seal member 10.

Hereafter, the operations of the aforementioned embodiment will be described. Depending upon the state in which the vehicle is used, each of the rubber mounts, especially each of the lower transverse rubber mounts $M_L$ and $M_R$ may occasionally be exposed to high water pressure such as the high water pressure of washing water sprayed from a car wash nozzle under high pressure or the water pressure of muddy water splashed upwards from a road surface at high speed. On such an occasion, the high water pressure can be directly received by each of the relatively hard thrust washers covering the outside of the elastic seal member 10 through the annular space S. Even if water should partially breach each thrust washer W, the pressure thereof can be effectively attenuated in the aforementioned annular space S acting as an expansion chamber. As a result, even if the elastic seal member 10 has its elasticity set to a relatively low level, it will not easily shift out of position or fall out, thus suitably sealing the clearance between the inner and outer cylinder portions 3 and 1. As a result, the rubber mount can exhibit its inherent damping function for a long time and has enhanced durability.

Although the present invention has been described hereinabove in connection with one embodiment, it should not be limited thereto but can be modified in various forms within the scope thereof. For example, application of the present invention is not limited to the four-wheel all terrain vehicle but can be applied to various vehicles such as a four-wheel automobile or a motorcycle. Moreover, the cover member has been exemplified in the aforementioned embodiment by the thrust washer W having the rubber cushion $RB_2$ and acting as the vibration proofing means for absorbing engine vibration in the axial direction of the bolt.

The cover member may be exemplified by a thrust washer made in its entirety of a rigid member having no vibration proofing function. In the aforementioned embodiment, the dust seal structure of the present invention is applied only to the lower rubber mount devices $M_L$ and $M_R$ while simplifying the structure of the upper rubber mount device $M_U$. If necessary, however, the dust seal structure of the present invention may also be applied to the upper rubber mount device $M_U$.

According to the invention, in the rubber mount device for a vehicular engine, the dust seal mechanism includes an elastic seal member for providing a watertight seal around the outside of the rubber cushion between the inner and outer cylinder portions; and a cover member for covering an outer face of the elastic seal member leaving a space S such that the elastic seal member is not exposed to water pressure during washing or the like. As a result, not only can the high water pressure during washing of a vehicle be directly received by the aforementioned cover member outside of the elastic seal member, but also the pressure of the water breaching the cover member is allowed to effectively attenuate within the inside space. Consequently, the elastic seal member will not easily shift out of position or fall out, and the clearance between the inner and outer cylinder portions can always be suitably sealed up by that seal member. Thus, the rubber mount can exhibit its inherent damping function for a long time to improve its durability.

According to the invention, the aforementioned cover member for preventing the water pressure during washing of a vehicle from acting upon the elastic seal member can also be used as the vibration proofing means for absorbing engine vibration in the axial direction of the bolt so that the structure can be accordingly simplified.

According to the invention, the elastic seal member is integrally molded in an annular shape from an elastic material and has its inner circumferential edge portion and its outer circumferential edge portion respectively lightly press-fitted against the inner cylinder portion and the outer cylinder portion. As a result, the elastic seal member has a simplified structure and is easily assembled between the inner and outer cylinder portions.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An elastic mount assembly comprising:
   an outer cylinder portion;
   an inner cylinder portion disposed radially inwardly of said outer cylinder portion;
   an elastic cushion extending between an outer surface of the inner cylinder portion and an inner surface of the outer cylinder portion;
   an elastic seal member for providing a watertight seal between the inner and outer cylinder portions, said elastic seal member being integrally molded in an annular shape and including an outer circumferential bead portion lightly press-fitted against said outer cylinder portion, an inner circumferential bead portion lightly press-fitted against said inner cylinder portion, and a seal body disposed between said outer bead portion and said inner bead portion for providing a watertight seal; and
   a cover member for covering an outer face of said elastic seal member, with a space formed between said cover member and said elastic seal member including a first annular space adjacent to said elastic seal and a second annular space disposed adjacent to said inner cylinder portion and in direct communication with said first annular space, said cover member being fitted to the inner cylinder portion and clamped against an end of said outer cylinder portion, said cover member including a first brace and a second brace with a resilient vibration absorbing material disposed therebetween for providing a seal for preventing exposure of said elastic seal to water pressure.

2. The elastic mount assembly as set forth in claim 1, wherein said seal body is of a predetermined length for spanning a distance disposed between said inner and outer cylinder portions.

3. The elastic mount assembly as set forth in claim 1, wherein said elastic cushion includes a tapered face being disposed adjacent to said elastic seal.

4. The elastic mount assembly as set forth in claim 3, wherein said elastic cushion includes a plurality of grooves disposed on an outer surface thereof for engaging an inner surface of said outer cylinder portion.

5. An elastic mount assembly comprising:
   an outer cylinder portion;
   an inner cylinder portion disposed radially inwardly of said outer cylinder portion;
   an elastic cushion extending between an outer surface of the inner cylinder portion and an inner surface of the outer cylinder portion, said elastic cushion having a first end and a second end;
   an elastic seal member positioned adjacent to each of said first end and second end of said elastic cushion for providing a watertight seal between the elastic cushion and the inner and outer cylinder portions, said elastic seal member being integrally molded in an annular shape and including an outer circumferential bead portion lightly press-fitted against said outer cylinder portion, an inner circumferential bead portion lightly press-fitted against said inner cylinder portion, and a seal body disposed between said outer bead portion and said inner bead portion for providing a watertight seal; and
   a cover member for covering each of the elastic seal members, a space being formed between each of the cover members and the elastic seal members, each space including a first annular space adjacent to said elastic seal and a second annular space disposed adjacent to said inner cylinder portion and in direct communication with said first annular space, each of said cover members being fitted to the inner cylinder portion and clamped against an end of said outer cylinder portion, said cover members each including a first brace and a second brace with a resilient vibration absorbing material disposed therebetween for providing a seal for preventing exposure of said elastic seal members to water pressure.

6. The elastic mount assembly as set forth in claim 5, wherein said seal body is of a predetermined length for spanning a distance disposed between said inner and outer cylinder portions.

7. The elastic mount assembly as set forth in claim 5, wherein said elastic cushion includes a tapered face being disposed adjacent to said elastic seal.

8. The elastic mount assembly as set forth in claim 7, wherein said elastic cushion includes a plurality of grooves disposed on an outer surface thereof for engaging an inner surface of said outer cylinder portion.

9. An elastic mount assembly comprising:
   an outer cylinder portion;
   an inner cylinder portion disposed radially inwardly of said outer cylinder portion;
   an elastic cushion extending between an outer surface of the inner cylinder portion and an inner surface of the outer cylinder portion;

an elastic seal member for providing a watertight seal between the inner cylinder portion and the outer cylinder portion, said elastic seal member being spaced from said elastic cushion to form a gap space between said elastic seal member and said elastic cushion; and a cover member clamped against an end of said outer cylinder portion for covering an outer face of said elastic seal member, with a space formed between said cover member and said elastic seal member which includes a first annular space adjacent to said elastic seal member and a second annular space disposed adjacent to said inner cylinder portion and in direct communication with said first annular space, said cover member preventing exposure of said elastic seal member to water pressure.

10. The elastic mount assembly as set forth in claim 9, wherein said cover member has an elastic vibration absorber for absorbing vibration in an axial direction of said inner cylinder portion.

11. The elastic mount assembly as set forth in claim 9, wherein said cover member is fitted to the inner cylinder portion.

12. The elastic mount assembly as set forth in claim 9, wherein said elastic seal member is integrally molded in an annular shape, said elastic seal member having an inner circumferential edge portion lightly press-fitted against said inner cylinder portion, and an outer circumferential edge portion lightly press-fitted against said outer cylinder portion.

13. The elastic mount assembly as set forth in claim 9, wherein said cover member includes a first brace and a second brace with a resilient vibration absorbing material disposed therebetween.

14. The elastic mount assembly as set forth in claim 9, wherein said elastic seal member includes an outer circumferential bead portion lightly press-fitted against said outer cylinder portion, an inner circumferential bead portion lightly fitted against said inner cylinder portion, and a seal body disposed between said outer bead portion and said inner bead portion, said seal body separating said gap space between said elastic seal member and said elastic cushion from said first annular space.

15. The elastic mount assembly as set forth in claim 14, wherein said seal body is of a predetermined length for spanning a distance disposed between said inner and outer cylinder portions.

16. The elastic mount assembly as set forth in claim 9, wherein said elastic cushion includes a tapered face being disposed adjacent to said elastic seal member.

17. The elastic mount assembly as set forth in claim 9, wherein said elastic cushion includes a plurality of grooves disposed on an outer surface thereof for engaging an inner surface of said outer cylinder portion.

* * * * *